United States Patent
Gao et al.

(10) Patent No.: US 12,193,048 B2
(45) Date of Patent: Jan. 7, 2025

(54) TECHNIQUES FOR MEASURING MULTIPLE SIGNAL TYPES USING A SINGLE NARROWBAND PROCESSOR

(71) Applicant: QUALCOMM Incorporated, San Diego, CA (US)

(72) Inventors: Kang Gao, San Diego, CA (US); Jun Zhu, San Diego, CA (US); Yong Li, San Diego, CA (US); Arvind Vardarajan Santhanam, San Diego, CA (US); Jun Hu, San Diego, CA (US); Heechoon Lee, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/888,008

(22) Filed: Aug. 15, 2022

(65) Prior Publication Data

US 2024/0057147 A1  Feb. 15, 2024

(51) Int. Cl.
*H04W 72/566* (2023.01)
*H04L 5/00* (2006.01)

(52) U.S. Cl.
CPC ......... *H04W 72/569* (2023.01); *H04L 5/0048* (2013.01)

(58) Field of Classification Search
CPC ............................ H04W 72/569; H04L 5/0048
See application file for complete search history.

(56) References Cited

U.S. PATENT DOCUMENTS

2021/0022108 A1*  1/2021  Li .......................... H04W 24/08

\* cited by examiner

*Primary Examiner* — Siming Liu
(74) *Attorney, Agent, or Firm* — Dalei Dong; Holland & Hart LLP

(57) ABSTRACT

Methods, systems, and devices for wireless communications are described. The method may include a user equipment (UE) identifying a priority scheme for a set of signals including a first set of synchronization signal block (SSB) signals associated with a first frequency range, a second set of SSB signals associated with a second frequency range, and a paging signal associated with the first frequency range. The UE may then monitor, via a narrowband processor of the UE and based on the priority scheme, a set of time resources for one or more of the first set of SSB signals, the second set of SSB signals, or the paging signal. The narrowband processor may be configured to process signals received via the first frequency range and the second frequency range.

30 Claims, 10 Drawing Sheets

TECHNIQUES FOR MEASURING MULTIPLE SIGNAL TYPES USING A SINGLE NARROWBAND PROCESSOR

FIELD OF DISCLOSURE

The present disclosure, for example, relates to wireless communications systems, more particularly to techniques for measuring multiple signal types using a single narrowband processor.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a UE may perform one or more measurement operations to communicate efficiently and effectively with devices of a wireless communications system (e.g., a network entity). Examples of the one or more measurement procedures may include measurement procedures related to beam management, cell addition, handover, or multi-subscriber identity module (MSIM).

SUMMARY

The described techniques relate to improved methods, systems, devices, and apparatuses that support techniques for measuring multiple signal types using a single narrowband processor. For example, the described techniques may include a user equipment (UE) identifying a priority scheme for a set of signals. The set of signals may include a first set of synchronization signal block (SSB) signals associated with a first frequency range (e.g., FR1), a second set of SSB signals associated with a second frequency range (e.g., FR2), and a paging signal associated with the first frequency range. As one example, the UE may identify a first priority for the first set of SSB signals, a second priority of the second set of SSBs signals, and a third priority of the third set of SSBs signals. The third priority may be greater than the first priority and the first priority may be greater than the second priority. Upon identifying the priority scheme, the UE may utilize a single narrowband processor to monitor a set of time resources for one or more of the set of signals based on the priority scheme. The narrowband processor may be configured to process signals received via the first frequency range and the second frequency range. Utilizing a single narrowband processor to process signals of multiple types may decrease the processing power and complexity of the UE.

A method for wireless communication at a UE is described. The method may include identifying a priority scheme for a set of multiple signals, the set of multiple signals including a first set of SSB signals associated with a first frequency range, a second set of SSB signals associated with a second frequency range, and a paging signal associated with the first frequency range and monitoring, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range.

An apparatus for wireless communication at a UE is described. The apparatus may include a processor, memory coupled with the processor, and instructions stored in the memory. The instructions may be executable by the processor to cause the apparatus to identify a priority scheme for a set of multiple signals, the set of multiple signals including a first set of SSB signals associated with a first frequency range, a second set of SSB signals associated with a second frequency range, and a paging signal associated with the first frequency range and monitor, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range.

Another apparatus for wireless communication at a UE is described. The apparatus may include means for identifying a priority scheme for a set of multiple signals, the set of multiple signals including a first set of SSB signals associated with a first frequency range, a second set of SSB signals associated with a second frequency range, and a paging signal associated with the first frequency range and means for monitoring, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range.

A non-transitory computer-readable medium storing code for wireless communication at a UE is described. The code may include instructions executable by a processor to identify a priority scheme for a set of multiple signals, the set of multiple signals including a first set of SSB signals associated with a first frequency range, a second set of SSB signals associated with a second frequency range, and a paging signal associated with the first frequency range and monitor, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range.

In some examples of the method, apparatuses, and non-transitory computer-readable medium described herein, identifying the priority scheme for the set of multiple signals may include operations, features, means, or instructions for identifying a first priority for the first set of SSB signals, identifying a second priority for a second set of SSB signals, and identifying a third priority for the paging signal.

In some examples of the method, apparatuses, and non-transitory computer-readable medium described herein, the third priority may be higher priority than the first priority. In some examples of the method, apparatuses, and non-transitory computer-readable medium described herein, the third priority may be higher priority than the second priority. In some examples of the method, apparatuses, and non-transitory computer-readable medium described herein, the first priority may be higher priority than the second priority.

In some examples of the method, apparatuses, and non-transitory computer-readable medium described herein, the monitoring may include operations, features, means, or instructions for monitoring a first subset of the set of time resources for a set of multiple the second set of SSB signals, where each of the set of multiple the second set of SSB signals may be associated with a different directional beam, where the second frequency range may be associated with the first subset of the set of time resources and monitoring a second subset of the set of time resources for the paging signal or the first set of SSB signals, where the first frequency range may be associated with the second subset of the set of time resources.

In some examples of the method, apparatuses, and non-transitory computer-readable medium described herein, the first subset of the set of time resources may be interleaved with the second subset of the set of time resources.

In some examples of the method, apparatuses, and non-transitory computer-readable medium described herein, the second subset of the set of time resources spans a duration that may be equal to or less than a search period configured for the second set of SSB signals.

In some examples of the method, apparatuses, and non-transitory computer-readable medium described herein, the monitoring may include operations, features, means, or instructions for monitoring a first subset of the set of time resources for the first set of SSB signals, where the first frequency range may be associated with the first subset of the set of time resources and monitoring a second subset of the set of time resources for the paging signal, where the first frequency range may be associated with the second subset of the set of time resources.

In some examples of the method, apparatuses, and non-transitory computer-readable medium described herein, the monitoring may include operations, features, means, or instructions for monitoring for one or both of the first set of SSB signals or the paging signal via the set of time resources and refraining from monitoring the set of time resources for the second set of SSB signals based on the priority scheme.

In some examples of the method, apparatuses, and non-transitory computer-readable medium described herein, the first frequency range includes FR1 and the second frequency range includes FR2. In some examples of the method, apparatuses, and non-transitory computer-readable medium described herein, the paging signal may be associated with MSIM. In some examples of the method, apparatuses, and non-transitory computer-readable medium described herein, the first frequency range and the second frequency range do not overlap.

DETAILED DESCRIPTION

Figure 1:
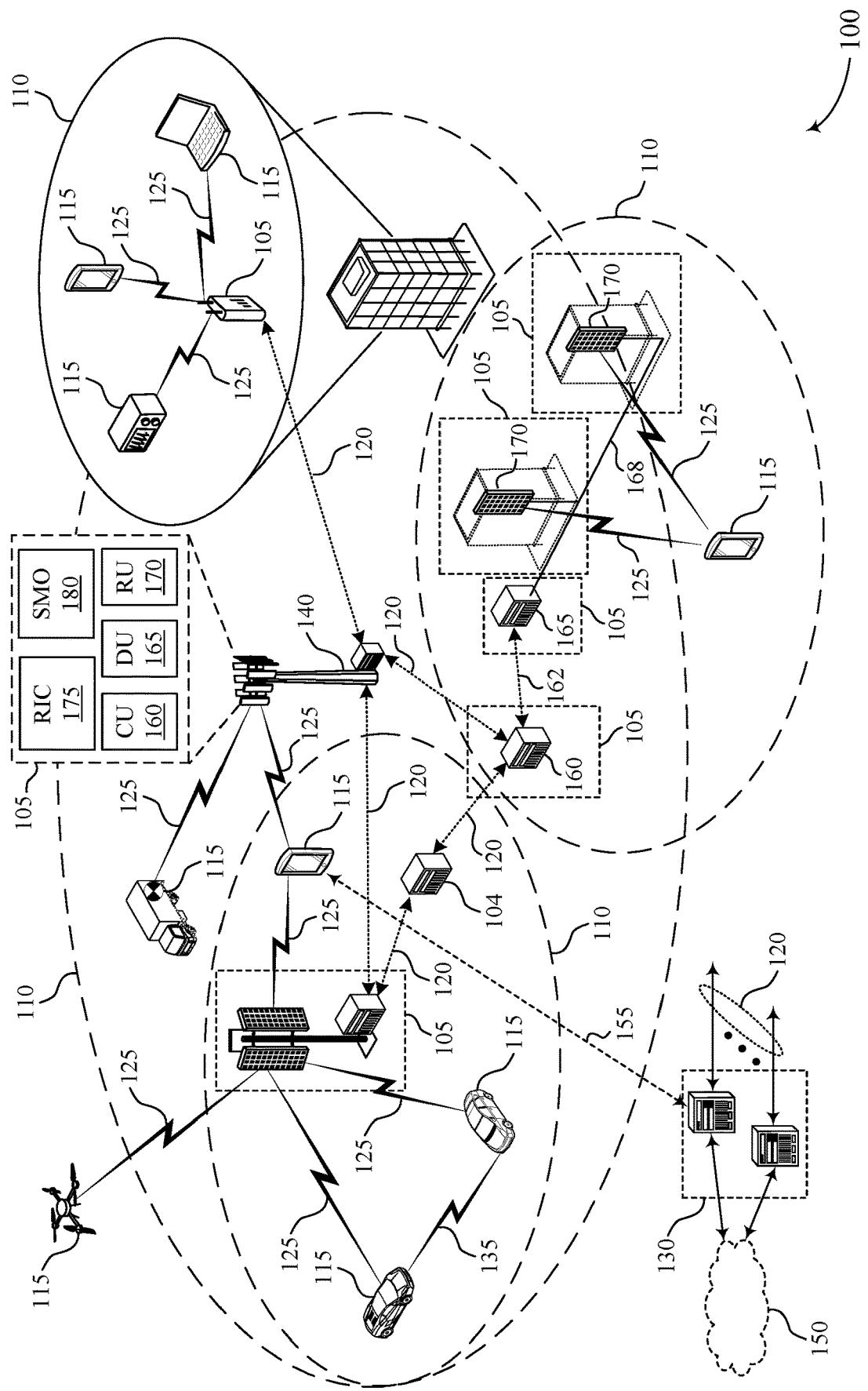
FIGS. 1 and 2 illustrate an example of a wireless communications system that supports techniques for measuring multiple signal types using a single narrowband processor in accordance with various aspects of the present disclosure.

In some examples, a user equipment (UE) may perform measurements on received signals to facilitate different procedures (e.g., acquire time and frequency synchronization or perform beam selection). As one example, the UE may monitor a first set of frequency resources (e.g., a narrowband in FR1) for a synchronization signal block (SSB) during a measurement gap of 160 milliseconds. In another example, the UE may monitor a second set of frequency resources (e.g., a narrowband in FR2) for a series of SSBs during a measurement gap of 1.28 seconds. In some examples, the UE may be configured to perform signal measurements in both FR1 and FR2. In order to perform multiple signal measurements, the UE may utilize a first narrowband processor (e.g., to perform signal measurements in FR1) and a second narrowband processor (e.g., to perform signal measurement in FR2). Utilizing multiple narrowband signal processor at one time may increase a processing power of the UE and may increase a complexity of the UE.

As described herein, a UE may utilize a single narrowband processor to perform multiple signal measurements. In some examples, the UE may include a narrowband processor that is configured to process signals received via a first range of frequency (e.g., FR1) and a second range of frequency (e.g., FR2). The UE may determine a priority scheme that indicates a priority for each of the different signals to be measured by the UE. For example, the priority scheme may indicate a priority for SSBs in FR1, SSBs in FR2, and paging signaling for multi-subscriber identity module (MSIM) in FR1. The priority for MSIM may be greater than the priority for SSBs in FR1, and the priority for SSBs in FR1 may be greater than the priority for SSBs in FR2. The UE may then determine which signals it is configured to measure for. If the UE is configured to measure SSBs in FR1, SSBs in FR2, and paging signaling in FR1, the UE may monitor, via the single narrowband processor, a set of time resources in such a way as to avoid collisions. For example, the UE may refrain from monitoring for a lowest priority signaling if a collision involving two signals is identified. As one example, the UE may refrain from monitoring a portion of the set of time resources for at least one SSB in FR2 and instead, monitor for an SSB in FR1 or the paging signaling in FR1 via the portion of the set of time resources. The described techniques may allow the UE to utilize only a single narrowband for multiple signal measurements which may decrease a processing power and a complexity of the UE, Aspects of the disclosure are initially described in the context of wireless communications systems. Additional aspects are described in the context of a timing diagram and a process flow. Aspects of the disclosure are further illustrated by and described with reference to apparatus diagrams, system diagrams, and flowcharts that relate to techniques for measuring multiple signal types using a single narrowband processor.

FIG. 1 illustrates an example of a wireless communications system 100 that supports techniques for measuring multiple signal types using a single narrowband processor in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for measuring multiple signal types using a single narrowband processor as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

As described herein, the UE 115 may utilize a single narrowband processor to measure multiple signals. In such example, the UE 115 may identify a priority scheme for a set of signals. The set of signals may include a first set of SSB signals associated with a first frequency range (e.g., FR1), a second set of SSB signals associated with a second frequency range (e.g., FR2), and a paging signal associated with the first frequency range. As one example, the UE 115 may identify a first priority for the first set of SSB signals, a second priority of the second set of SSBs signals, and a third priority of the third set of SSBs signals. The third priority may be greater than the first priority and the first priority may be greater than the second priority. Upon identifying the priority scheme, the UE 115 may utilize a single narrowband processor to monitor a set of time resources for one or more of the set of signals based on the priority scheme. The narrowband processor may be configured to process signals received via the first frequency range and the second frequency range. Utilizing a single narrowband processor to process signals of multiple types may decrease the processing power and complexity of the UE.

Figure 2:
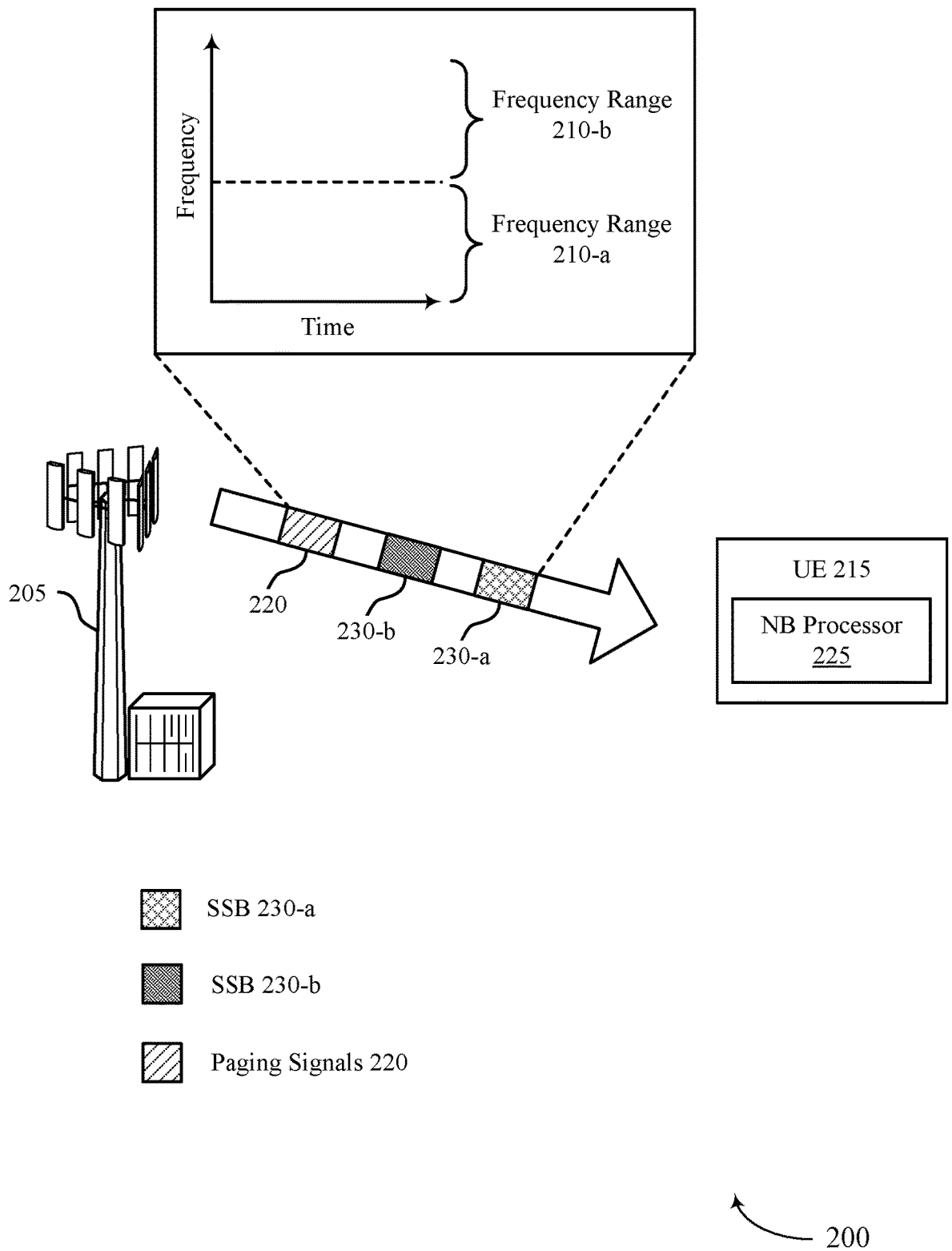

FIG. 2 illustrates an example of a wireless communications system 200 that supports techniques for measuring multiple signal types using a single narrowband processor in accordance with various aspects of the present disclosure. In some examples, the wireless communications system 200 may include aspects of a wireless communications system 100. For example, the wireless communications system 200 may include a UE 215 which may be an example of a UE 115 as described with reference to FIG. 1. Further, the wireless communications system 200 may include a network entity 205 which may be an example of a network entity 105 as described with reference to FIG. 1.

In some examples, the UE 215 may perform one or more measurement procedures in order to communicate efficiently and effectively with the network entity 205. The UE 215 may perform the one or more measurement procedures in different frequency ranges 210. The frequency ranges 210 supported by the UE 215 may include a frequency range 210-a and a frequency range 210-b. The frequency range 210-a may be known as FR1 and may span a frequency range of 410 MHz to 7125 MHz and the frequency range 210-b may be known as FR2 and may span a frequency range of 24250 MHz to 52600 MHz. For each frequency range 210, the UE 215 may utilize one or more CCs for communications with the network entity 205. For FR1, the UE 215 may utilize a primary CC (PCC) and a secondary CC (SCC) and for FR2, the UE 215 may utilize a PCC. In some examples, the FR1 frequency band may be used to carry traditional cellular communication traffic and the FR2 frequency band may be used for short-range and high data rate communications.

In the frequency range 210-b, the UE 215 may perform search and measurement procedures for beam management. For example, the network entity 205 may transmit, via the PCC of the frequency range 210-b, a sequences of SSBs 230-a using a set of directional beams. The UE 215 may measure a signal strength of the SSBs 230-a and report a best directional beam to the network entity 205 based on the signal strength measurement. Alternatively, in the frequency range 210-a, the UE 215 may perform search and measurement procedures for the purpose of handover, CC addition, and time and frequency synchronization. In such example, the network entity 205 may transmit, via one or both of the PCC or the SCC, an SSB 230-b to the UE 215. The UE 215 may measure a signal strength of the SSB 230-b and report the signal strength to the network entity 205. Based on the signal strength, the network entity 205 may determine whether handover or CC addition may be performed. Additionally, in the frequency range 210-a, the UE 215 may perform search and measurement procedures for MSIM. A MSIM device may have the ability to use multiple subscriptions, potentially for different networks. If the UE 215 supports MSIM, the UE 215 may monitor for paging signals 220 associated with a first subscription or a second subscription in order to determine which subscription (e.g., the first subscription or the second subscription) to activate at a given time.

In some examples, prior to performing the one or more measurements procedures, the UE 215 may receive control signaling indicating a parameter associated with each of the one or more measurement procedures. In one example, the parameter may include a search period for each of the one or more measurement procedures. The search period may be the periodicity at which the UE 215 performs the respective measurement procedure. In one example, the search period for SSBs 230-a in the frequency range 210-b may be equal to 1.28 seconds, the search period for SSBs in the frequency range 210-a may be equal to 160 milliseconds, and the search period for paging signals 220 in the frequency range 210-b may be equal to 320 milliseconds.

In some examples, the UE 215 may perform one measurement procedure at one time or multiple measurement procedures at one time. In the case that the UE 215 is configured to perform multiple measurement procedure at one time, there may be a chance of collisions between different signaling for different measurement procedures. As such, in an effort to avoid collisions, a UE 215 may include a narrowband processor 225 for each measurement procedure. For example, the UE 215 may include a narrowband processor 225 for SSBs 230-b in FR1, a narrowband processor 225 for SSBs 230-a in FR2, and a narrowband processor 225 for MSIM paging signals 220 in FR1. Using the multiple narrowband processors 225, the UE 215 may be able to perform multiple measurement procedures because none of the signals (e.g., SSBs 230 or MSIM paging signals 220) may occupy a same narrowband resource (e.g., time and frequency resources associated with each narrowband processor 225). However, equipping the UE 215 with multiple narrowband processors 225 may increase manufacturing cost and additionally, running multiple narrowband processors 225 may increase the processing power of the UE 215.

As described herein, the UE 215 may utilize a single narrowband processor 225 to process signals of multiple measurement procedures. That is, the narrowband processor 225 may process signals received over resources of the frequency range 210-*a* and the frequency range 210-*b*. As a first step, the UE 215 may determine how many and which measurement procedures it is configured to perform. In one example, the UE 215 may be configured to measure SSBs 230-*a* in the frequency range 210-*b*, measure SSBs 230-*b* in the frequency range 210-*a*, and measure for MSIM paging signals 220 in the frequency range 210-*a*. Further, the UE 215 may identify a priority scheme for the different types of signaling. The priority scheme may indicate a priority for each type of signaling. For example, the priority scheme may indicate a first priority for SSBs 230-*b*, a second priority for SSBs 230-*a*, and a third priority for the paging signals 220. In some examples, the third priority may be greater than the second priority and the second priority may be greater than the first priority. Whenever collisions happen, the higher priority signaling is monitored for using the narrowband processor 225 and monitoring of the lower priority signaling is scheduled for a different time.

In one example, the UE 215 may identify that a collision may occur between at least two different types of signaling. For example, the UE 215 may determine that a collision may occur while monitoring for SSBs 230-*a* and SSBs 230-*b*. As described above, the search period configured for the SSBs 230-*a* may be 1.28 seconds. In order to perform the beam management procedure, the UE 215 may monitor for and measure 20 SSBs 230-*a* in the frequency range 210-*b* during the search period. Each SSB 230-*a* has duration of 20 milliseconds and as such, the UE 215 may potentially monitor for 20 SSBs 230-*a* during the first 0.4 seconds of the search period of 1.28 seconds. During that 0.4 seconds, the UE 215 may be scheduled to monitor for SSBs 230-*b* (e.g., every 160 ms) and as such, a collision may occur (e.g., UE 215 may be scheduled to monitor for two different signals using a same narrowband resource during a same time period).

To avoid collision, the UE 215 may refrain from monitoring for the SSBs 230-*a* during times that the UE 215 is scheduled to monitor for the SSBs 230-*b* and monitor for the SSBs 230-*a* at a different time. The UE 215 may refrain from monitoring the SSBs 230-*a* as opposed to the SSBs 230-*b* because the priority scheme indicates the second priority is greater the first priority. As described above, the search period for SSBs 230-*a* may be equal to 1.28 seconds. As such, the UE 215 may monitor for the remaining SSBs 230-*a* (e.g., SSBs 230-*a* missed due to collision with SSBs 230-*b*) during the remaining 0.88 seconds of the search period. Using the methods as described herein may allow a UE 215 to utilize the single narrowband processor 225 for processing signals of different types while avoiding collision. Such methods may reduce costs associated with manufacturing the UE 215 and reduce the processing power expended by the UE 215.

Figure 3:
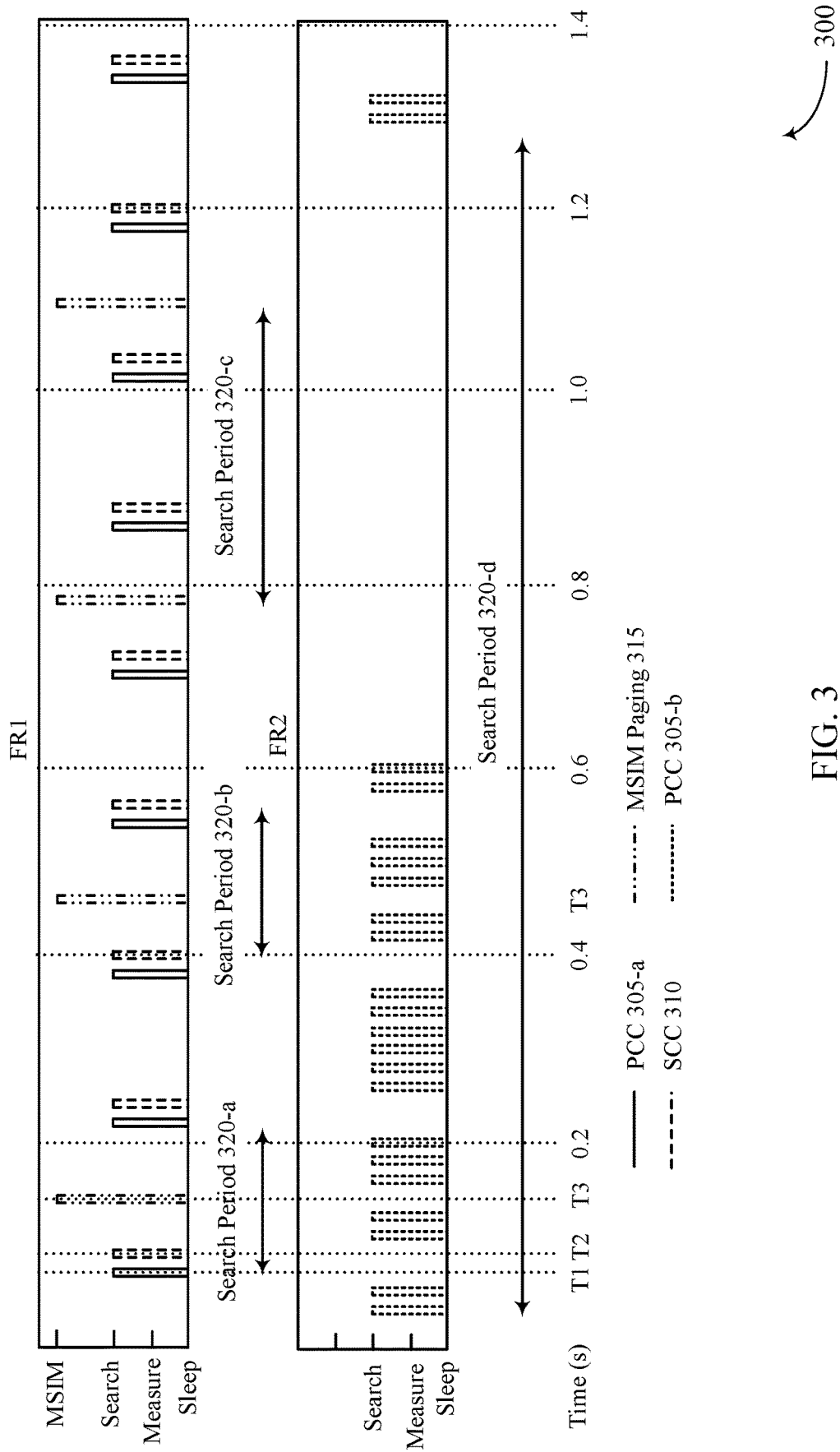
FIG. 3 illustrates an example of a timing diagram that supports techniques for measuring multiple signal types using a single narrowband processor in accordance with various aspects of the present disclosure.

FIG. 3 illustrates an example of a timing diagram 300 that supports techniques for measuring multiple signal types using a single narrowband processor in accordance with various aspects of the present disclosure. In some examples, the timing diagram 300 may be implemented by aspects of a wireless communications system 100 and a wireless communications system 200. For example, the timing diagram 300 may be implemented by a UE which may be an example of a UE 115 or a UE 215 as described with reference to FIGS. 1 and 2, respectively.

As described with reference to FIG. 2, a UE may be configured to perform two or more search and measurement procedures concurrently. For example, the UE may be configured perform search and measurement of SSBs in FR1, SSBs in FR2, and MSIM paging 315 in FR1. In addition, the UE may include a single narrowband processor and utilize the single narrowband processor to perform the two or more measurement procedures. As such, the UE may perform the two or more measurement procedures using a single narrowband resource (e.g., a single processing resource). In such example, the UE may identify a priority framework associated with the two or more search and measurement procedures. The priority framework may specify a priority for each of the two or more search and measurement procedures. For example, the priority framework may indicate that the search and measurement procedure associated with MSIM paging 315 has a higher priority than the search and measurement procedure associated with SSBs in FR1 and the search and measurement procedure associated with SSBs in FR1 has a higher priority than the search and measurement procedure associated with SSBs in FR2.

The UE may implement the priority framework if the UE determines that a collision may occur between the two or more search and measurement procedures. In the example of FIG. 3, the UE may determine that a collision may occur at least at T1, T2, and T3. As described with reference to FIG. 2, each of the two or more search and measurement procedures may have an associated search period 320. As shown in FIG. 3, the UE may search for SSBs in FR1 according to a search period 320-*a* (e.g., every 160 milliseconds), search for MSIM paging 315 according to a search period 320-*b* (e.g., every 320 milliseconds), and search for a series of SSBs in FR2 according to a search period 320-*c* (e.g., every 1.28 seconds). At T1, the UE may be scheduled to search for an SSB in a PCC 305 of FR1 and additionally, the UE may be scheduled to search for an SSB in a PCC 305-*b* of FR2. The priority of the search and measurement procedure associated with SSBs of FR1 may be greater than the priority of the search and measurement procedure associated with SSBs of FR2 (e.g., as indicated by the priority framework). As such, the UE may refrain from monitoring for the SSB in FR2 during T1 and monitor for the SSB in FR1 instead at T1.

At T2, the UE may be scheduled to search for an SSB in a SCC 310 of FR1 and additionally, the UE may be scheduled to search for an SSB in a PCC 305-*b* of FR2. The priority of the search and measurement procedure associated with SSBs of FR1 may be greater than the priority of the search and measurement procedure associated with SSBs of FR2. As such, the UE may refrain from monitoring for the SSB in FR2 during T2 and monitor for the SSB in FR1 instead at T2.

At T3, the UE may be scheduled to search for MSIM paging 315 in FR1 and additionally, the UE may be scheduled to search for an SSB in a PCC 305-*b* of FR2. The priority of the search and measurement procedure associated with MSIM paging 315 in FR1 may be greater than the priority of the search and measurement procedure associated with SSBs of FR2. As such, the UE may refrain from monitoring for the SSB in FR2 during T3 and monitor for the MSIM paging 315 in FR1 instead. That is, the UE may puncture the scheduling of lower priority signals such that higher priority signals may be monitored for.

In some examples, the signaling that the UE missed (e.g., lower priority signaling that the UE refrained from monitoring) may be scheduled for a later time. For example, in order to perform beam management, the UE may measure a series of 20 SSBs in FR2 during the search period 320-d. The UE may receive 20 SSBs in as little as 0.4 seconds and the search period 320-d may be equal to 1.28 seconds. This may leave 0.88 seconds of the search period 320-d available. As such, the UE may schedule the missed SSBs during the available 0.88 seconds. Additionally, in an effort to avoid collisions between monitoring for SSBs in FR1 and monitoring for MSIM paging 315 in FR1, the UE may schedule the monitoring of the MSIM paging 315 to occur in between monitoring for both the SSB in the PCC of FR1 and the SSB in the SCC of FR1. Doing so may allow the UE to monitoring for both SSBs in FR1 and MSIM paging 315 in FR1 according to their respective search periods 320 without collision. However, if a collision were to occur between the MSIM 315 and the SSBs in FR1 during a time period, the UE may refrain from monitoring for the SSBs in FR1 during the time period based on the priority framework. The UE may use similar methods as described above for other collision that may occur after T3.

Figure 4:
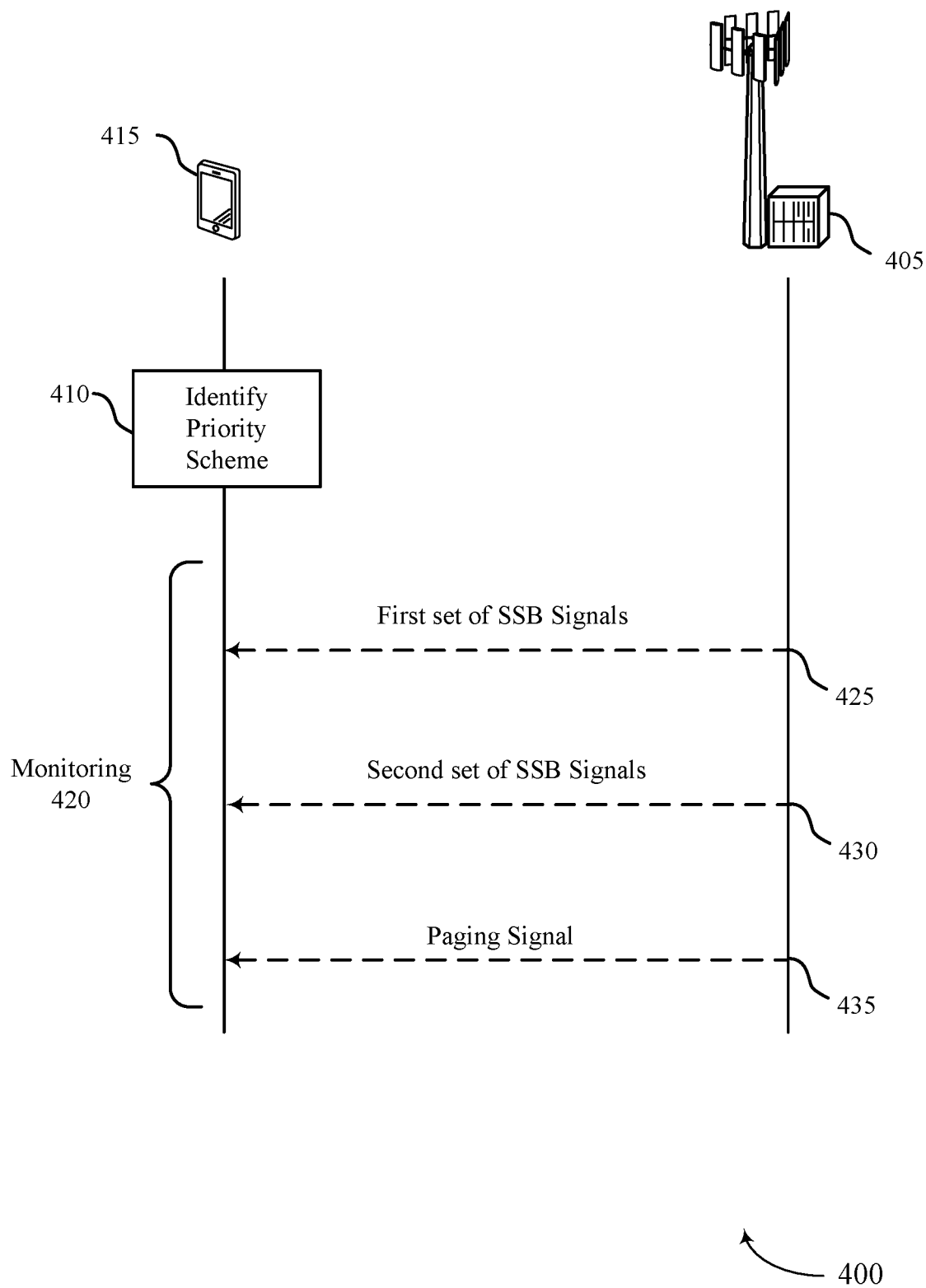
FIG. 4 illustrates an example of a process flow that supports techniques for measuring multiple signal types using a single narrowband processor in accordance with various aspects of the present disclosure.

FIG. 4 illustrates an example of a process flow 400 that supports techniques for measuring multiple signal types using a single narrowband processor in accordance with various aspects of the present disclosure. In some examples, the process flow 400 may include aspects of a wireless communications system 100 and a wireless communications system 200. For example, the process flow 400 may include a UE 415 which may be an example of a UE 115 or a UE 215 as described with reference to FIGS. 1 and 2, respectively. Further, the process flow 400 may include a network entity 405 which may be an example of a network entity 105 or a network entity 205 as described with reference to FIGS. 1 and 2, respectively. Alternative examples of the following may be implemented, where some steps are performed in a different order than described or are not performed at all. In some cases, steps may include additional features not mentioned below, or further steps may be added.

At 410, the UE 415 may identify a priority scheme for a set of signals. The set of signals may include a first set of SSB signals associated with a first frequency range, a second set of SSB signals associated with a second frequency range, and a paging signal (e.g., paging signal for MSIM) associated with the first frequency range. In some examples, the first frequency range may include FR1 and the second frequency range may include FR2. Additionally, the first frequency range may not overlap with the second frequency range. In some examples, the priority scheme may indicate a priority for each of the signals of the set of signals. For example, the priority scheme may indicate a first priority for the first set of SSB signals, a second priority for the second set of SSB signals, and a third priority for the paging signal. In some examples, the third priority may be higher than the first priority. Additionally, the third priority may be higher than the second priority. Additionally, the first priority may be higher than the second priority.

At 420, the UE 415 may monitor a set of time resources for at least one signal of the set of signals. In some examples, the UE 415 may utilize single narrowband processor to monitor for the at least one signal of the set of signals. Additionally, the UE 415 may monitor the set of time resource based on the priority scheme. In one example, the UE 415 may monitor a first subset of the set of time resources for a series of the second set of SSB signals at 430 and monitor a second subset of the time resource for the paging signal at 435 or the first set of SSBs at 425. Each second set of SSB signals in the series may be associated with a different directional beam. In some examples, the first subset of the set of time resources may be interleaved with the second subset of the set of time resources. Further, the second subset of time resource may span a duration that is equal to or less than a search period configured for the second set of SSB signals. In another example, the UE 415 may monitor a first subset of the set of time resources for the first set of SSB signals at 425 and monitor a second subset of the set of time resources for the paging signal at 430. In another example, the UE 415 may monitor the set of time resources for one or both of the first set of SSB signals at 425 or the paging signal at 430 and refrain from monitoring the set of time resource for the second set of SSB signals at 430 based on the priority scheme.

Figure 5:
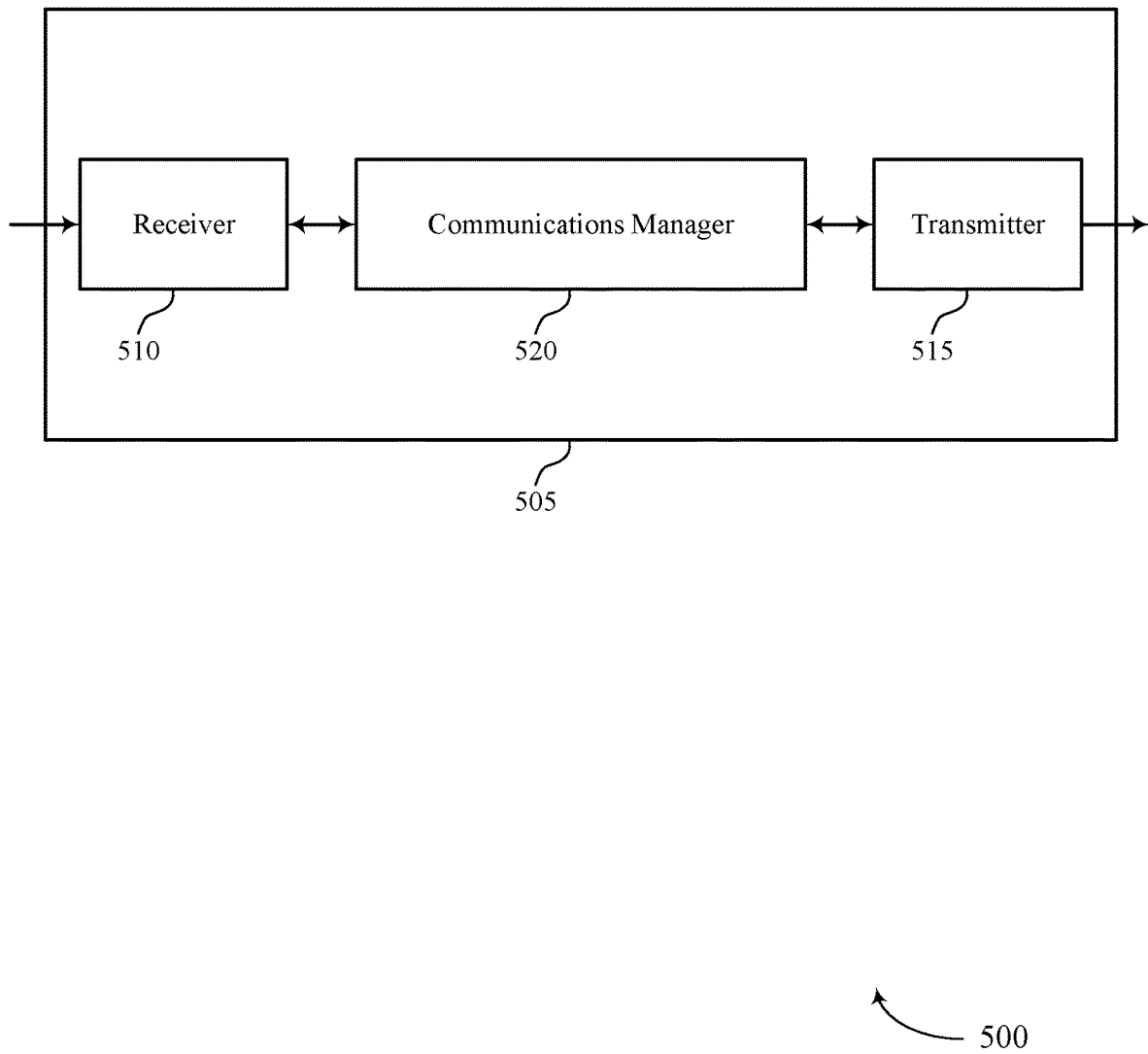
FIGS. 5 and 6 show block diagrams of devices that support techniques for measuring multiple signal types using a single narrowband processor in accordance with various aspects of the present disclosure.

FIG. 5 shows a block diagram 500 of a device 505 that supports techniques for measuring multiple signal types using a single narrowband processor in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for measuring multiple signal types using a single narrowband processor). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for measuring multiple signal types using a single narrowband processor). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for measuring multiple signal types using a single narrowband processor as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for identifying a priority scheme for a set of multiple signals, the set of multiple signals including a first set of SSB signals associated with a first frequency range, a second set of SSB signals associated with a second frequency range, and a paging signal associated with the first frequency range. The communications manager 520 may be configured as or otherwise support a means for monitoring, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing and reduced power consumption.

Figure 6:
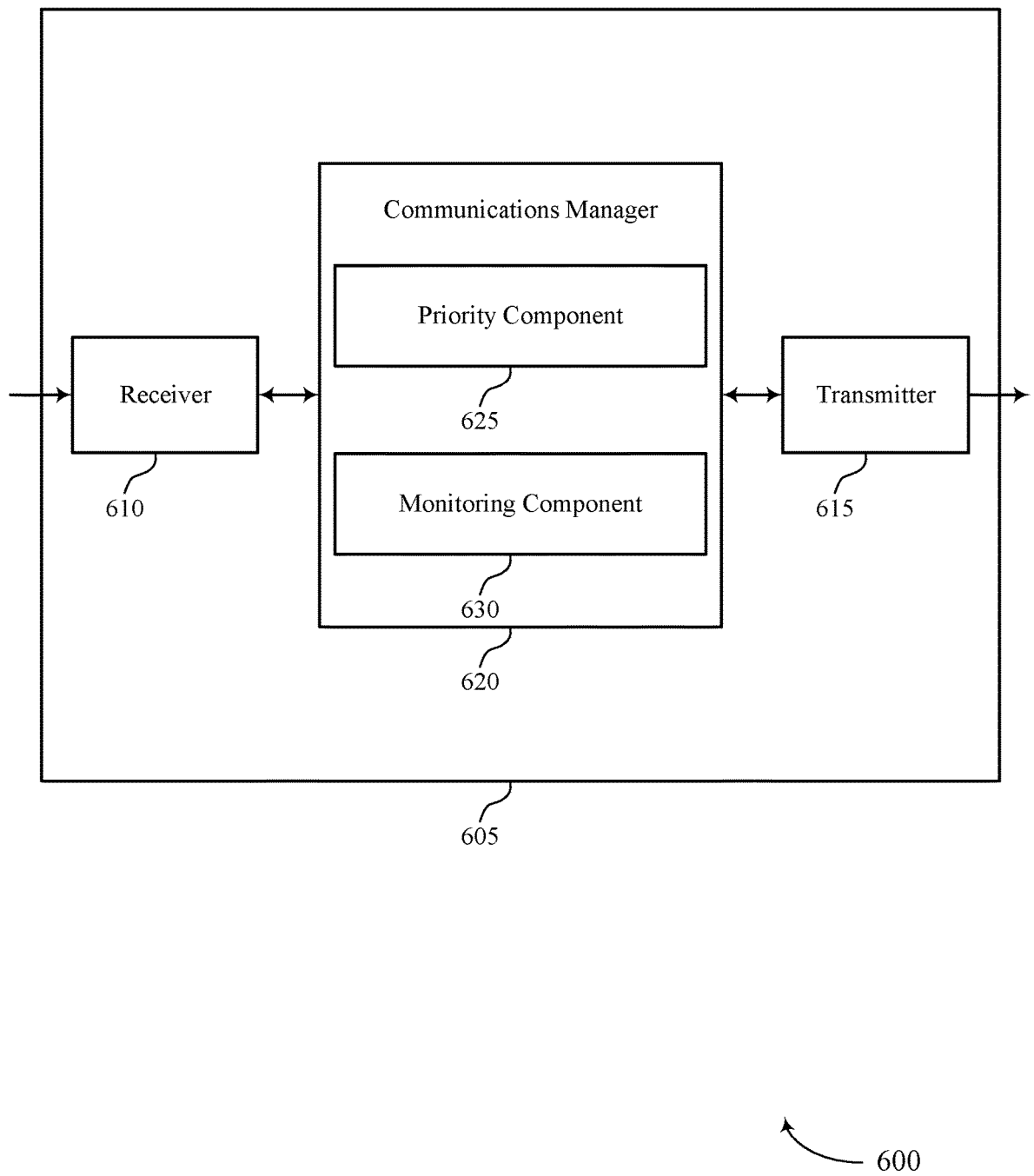

FIG. 6 shows a block diagram 600 of a device 605 that supports techniques for measuring multiple signal types using a single narrowband processor in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for measuring multiple signal types using a single narrowband processor). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for measuring multiple signal types using a single narrowband processor). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for measuring multiple signal types using a single narrowband processor as described herein. For example, the communications manager 620 may include a priority component 625 a monitoring component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The priority component 625 may be configured as or otherwise support a means for identifying a priority scheme for a set of multiple signals, the set of multiple signals including a first set of SSB signals associated with a first frequency range, a second set of SSB signals associated with a second frequency range, and a paging signal associated with the first frequency range. The monitoring component 630 may be configured as or otherwise support a means for monitoring, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range.

Figure 7:
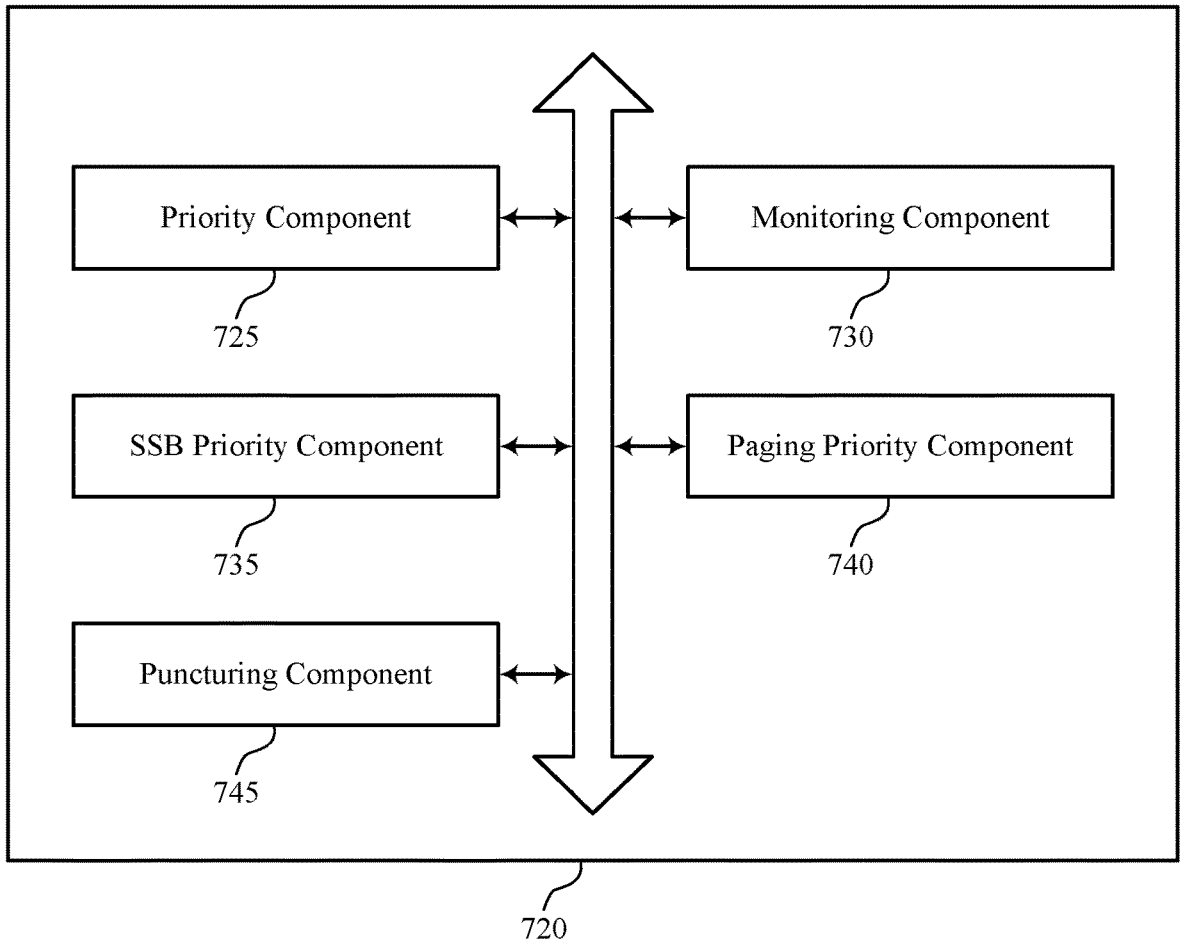
FIG. 7 shows a block diagram of a communications manager that supports techniques for measuring multiple signal types using a single narrowband processor in accordance with various aspects of the present disclosure.

FIG. 7 shows a block diagram 700 of a communications manager 720 that supports techniques for measuring multiple signal types using a single narrowband processor in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for measuring multiple signal types using a single narrowband processor as described herein. For example, the communications manager 720 may include a priority component 725, a monitoring component 730, an SSB priority component 735, a paging priority component 740, a puncturing component 745, or any combination thereof. Each of these components may communicate, directly or indirectly, with one another (e.g., via one or more buses).

The communications manager 720 may support wireless communication at a UE in accordance with examples as disclosed herein. The priority component 725 may be configured as or otherwise support a means for identifying a priority scheme for a set of multiple signals, the set of multiple signals including a first set of SSB signals associated with a first frequency range, a second set of SSB signals associated with a second frequency range, and a paging signal associated with the first frequency range. The monitoring component 730 may be configured as or otherwise support a means for monitoring, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range.

In some examples, to support identifying the priority scheme for the set of multiple signals, the SSB priority component 735 may be configured as or otherwise support a means for identifying a first priority for the first set of SSB signals. In some examples, to support identifying the priority scheme for the set of multiple signals, the SSB priority component 735 may be configured as or otherwise support a means for identifying a second priority for a second set of SSB signals. In some examples, to support identifying the priority scheme for the set of multiple signals, the paging priority component 740 may be configured as or otherwise support a means for identifying a third priority for the paging signal.

In some examples, the third priority is higher priority than the first priority. In some examples, the third priority is higher priority than the second priority. In some examples, the first priority is higher priority than the second priority.

In some examples, to support monitoring, the monitoring component 730 may be configured as or otherwise support a means for monitoring a first subset of the set of time resources for a set of multiple the second set of SSB signals, where each of the set of multiple the second set of SSB signals is associated with a different directional beam, where the second frequency range is associated with the first subset of the set of time resources. In some examples, to support monitoring, the monitoring component 730 may be configured as or otherwise support a means for monitoring a second subset of the set of time resources for the paging signal or the first set of SSB signals, where the first frequency range is associated with the second subset of the set of time resources.

In some examples, the first subset of the set of time resources is interleaved with the second subset of the set of time resources. In some examples, the second subset of the set of time resources spans a duration that is equal to or less than a search period configured for the second set of SSB signals.

In some examples, to support monitoring, the monitoring component 730 may be configured as or otherwise support a means for monitoring a first subset of the set of time resources for the first set of SSB signals, where the first frequency range is associated with the first subset of the set of time resources. In some examples, to support monitoring, the monitoring component 730 may be configured as or otherwise support a means for monitoring a second subset of the set of time resources for the paging signal, where the first frequency range is associated with the second subset of the set of time resources.

In some examples, to support monitoring, the monitoring component 730 may be configured as or otherwise support a means for monitoring for one or both of the first set of SSB signals or the paging signal via the set of time resources. In some examples, to support monitoring, the puncturing component 745 may be configured as or otherwise support a means for refraining from monitoring the set of time resources for the second set of SSB signals based on the priority scheme.

In some examples, the first frequency range includes FR1 and the second frequency range includes FR2. In some examples, the paging signal is associated with multi-subscriber identity modules. In some examples, the first frequency range and the second frequency range do not overlap.

Figure 8:
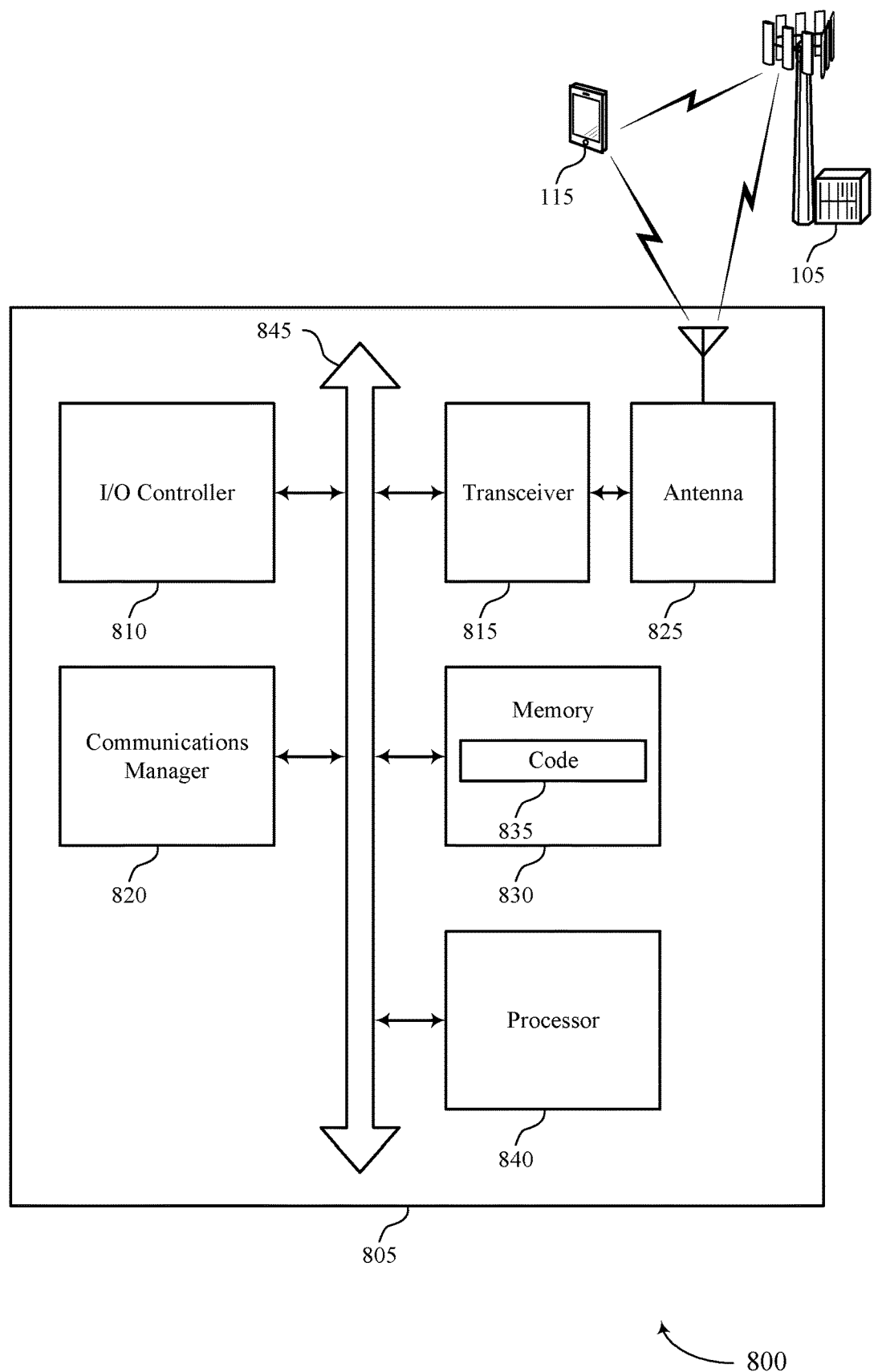
FIG. 8 shows a diagram of a system including a device that supports techniques for measuring multiple signal types using a single narrowband processor in accordance with various aspects of the present disclosure.

FIG. 8 shows a diagram of a system 800 including a device 805 that supports techniques for measuring multiple signal types using a single narrowband processor in accordance with various aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for measuring multiple signal types using a single narrowband processor). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying a priority scheme for a set of multiple signals, the set of multiple signals including a first set of SSB signals associated with a first frequency range, a second set of SSB signals associated with a second frequency range, and a paging signal associated with the first frequency range. The communications manager 820 may be configured as or otherwise support a means for monitoring, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range.

By including or configuring the communications manager 820 in accordance with examples as described herein, the device 805 may support techniques for improved user experience related to reduced processing, reduced power consumption, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for measuring multiple signal types using a single narrowband processor as described herein, or the processor 840 and the memory 830 may be otherwise configured to perform or support such operations.

Figure 9:
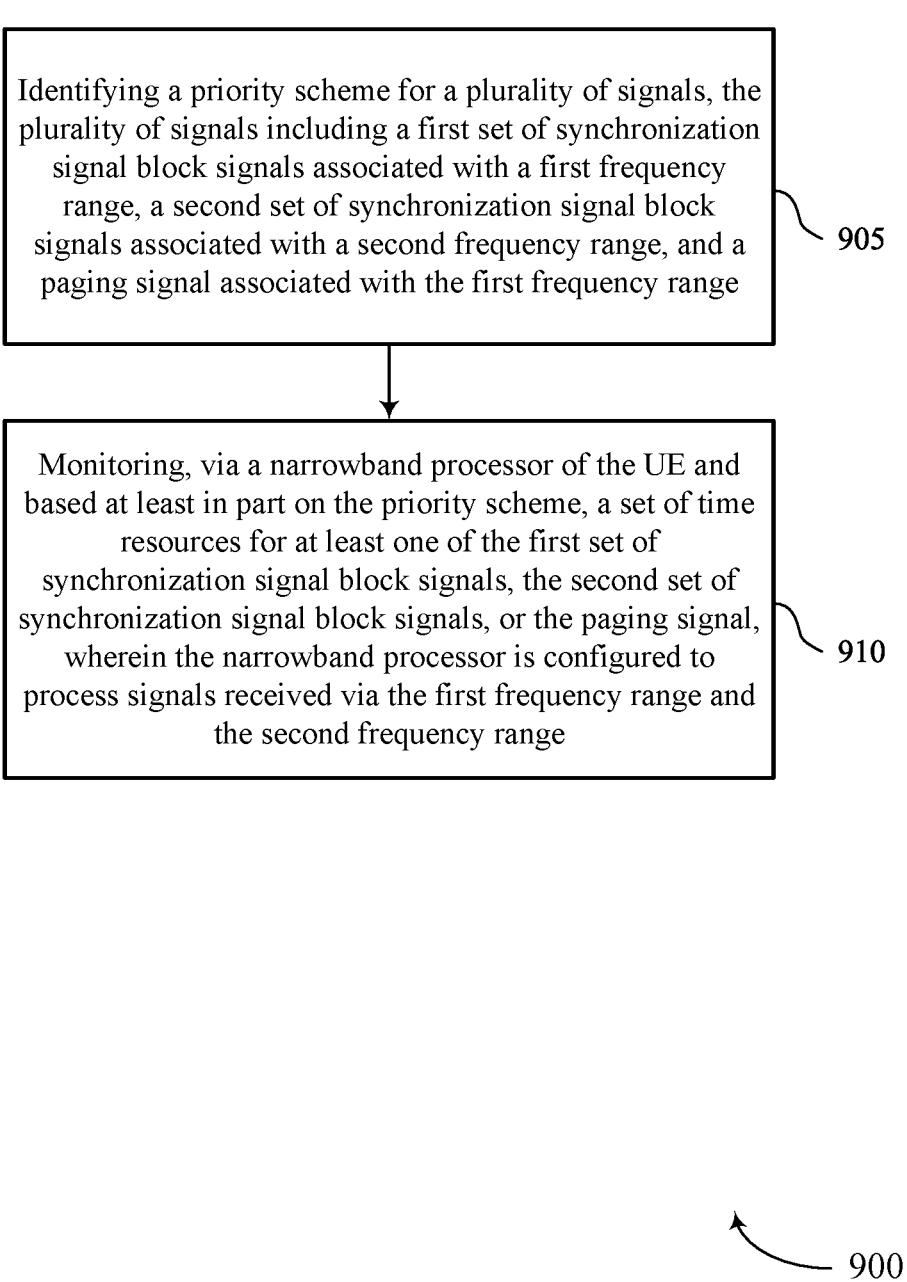
FIGS. 9 and 10 show flowcharts illustrating methods that support techniques for measuring multiple signal types using a single narrowband processor in accordance with various aspects of the present disclosure.

FIG. 9 shows a flowchart illustrating a method 900 that supports techniques for measuring multiple signal types using a single narrowband processor in accordance with various aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include identifying a priority scheme for a set of multiple signals, the set of multiple signals including a first set of SSB signals associated with a first frequency range, a second set of SSB signals associated with a second frequency range, and a paging signal associated with the first frequency range. The operations of 905 may be performed in accordance with examples as disclosed herein. In some examples, aspects of the operations of 905 may be performed by a priority component 725 as described with reference to FIG. 7.

At 910, the method may include monitoring, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range. The operations of 910 may be performed in accordance with examples as disclosed herein. In some examples, aspects of the operations of 910 may be performed by a monitoring component 730 as described with reference to FIG. 7.

Figure 10:
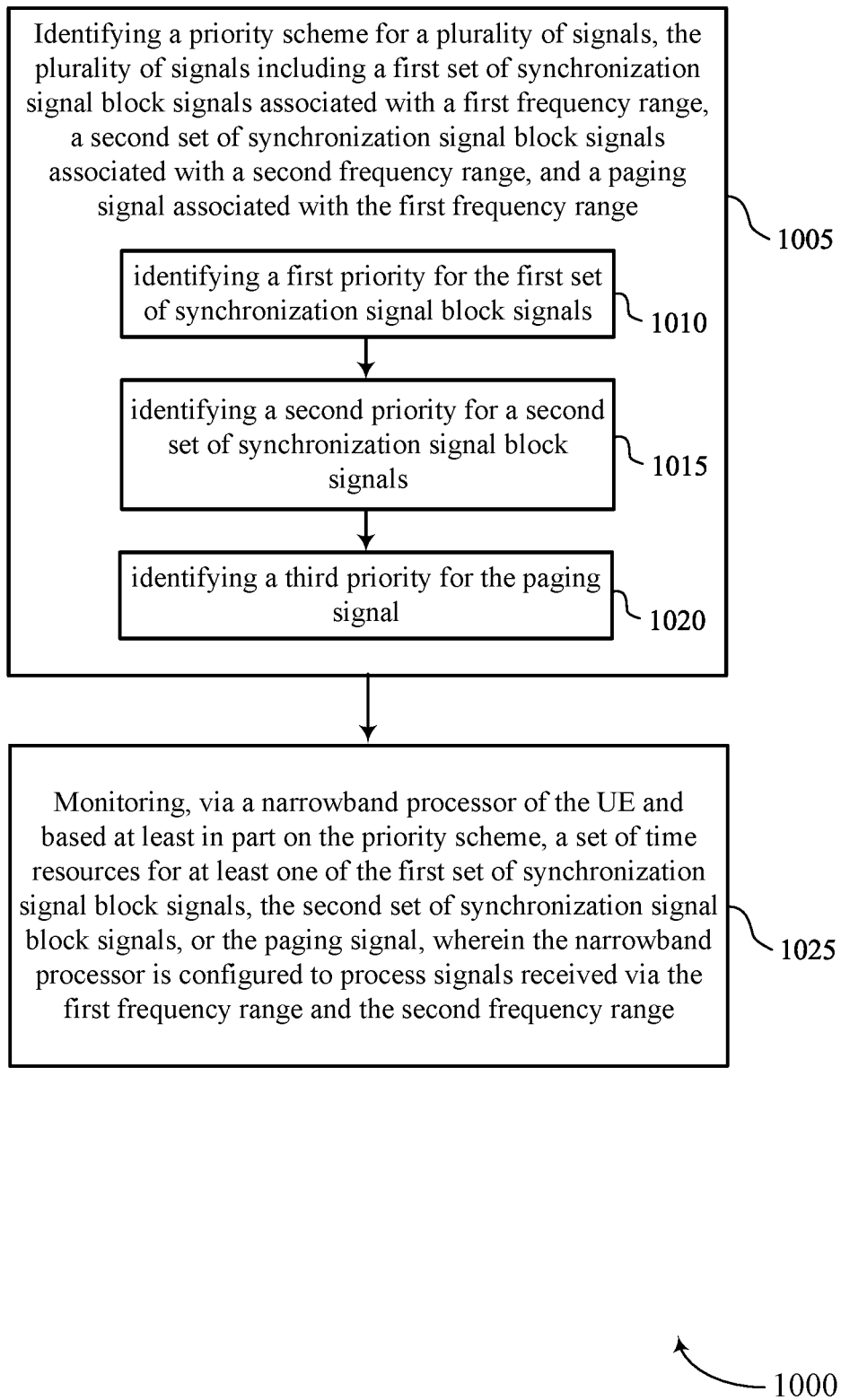

FIG. 10 shows a flowchart illustrating a method 1000 that supports techniques for measuring multiple signal types using a single narrowband processor in accordance with various aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include identifying a priority scheme for a set of multiple signals, the set of multiple signals including a first set of SSB signals associated with a first frequency range, a second set of SSB signals associated with a second frequency range, and a paging signal associated with the first frequency range. The operations of 1005 may be performed in accordance with examples as disclosed herein. In some examples, aspects of the operations of 1005 may be performed by a priority component 725 as described with reference to FIG. 7. In some examples, the step 1005 may include the following steps 1010 through 1020.

At 1010, the method may include identifying a first priority for the first set of SSB signals. The operations of 1010 may be performed in accordance with examples as disclosed herein. In some examples, aspects of the operations of 1010 may be performed by an SSB priority component 735 as described with reference to FIG. 7.

At 1015, the method may include identifying a second priority for a second set of SSB signals. The operations of 1015 may be performed in accordance with examples as disclosed herein. In some examples, aspects of the operations of 1015 may be performed by an SSB priority component 735 as described with reference to FIG. 7.

At 1020, the method may include identifying a third priority for the paging signal. The operations of 1020 may be performed in accordance with examples as disclosed herein. In some examples, aspects of the operations of 1020 may be performed by a paging priority component 740 as described with reference to FIG. 7.

At 1025, the method may include monitoring, via a narrowband processor of the UE and based on the priority scheme, a set of time resources for at least one of the first set of SSB signals, the second set of SSB signals, or the paging signal, where the narrowband processor is configured to process signals received via the first frequency range and the second frequency range. The operations of 1025 may be performed in accordance with examples as disclosed herein. In some examples, aspects of the operations of 1025 may be performed by a monitoring component 730 as described with reference to FIG. 7.

Aspect 1: A method for wireless communication at a UE, comprising: identifying a priority scheme for a plurality of signals, the plurality of signals including a first set of SSB signals associated with a first frequency range, a second set of SSB signals associated with a second frequency range, and a paging signal associated with the first frequency range; and monitoring, via a narrowband processor of the UE and based at least in part on the priority scheme, a set of time resources for at least one of the first set of SSB signals, the second set of SSB signals, or the paging signal, wherein the narrowband processor is configured to process signals received via the first frequency range and the second frequency range.

Aspect 2: The method of aspect 1, wherein identifying the priority scheme for the plurality of signals comprises: identifying a first priority for the first set of SSB signals; identifying a second priority for a second set of SSB signals; and identifying a third priority for the paging signal.

Aspect 3: The method of aspect 2, wherein the third priority is higher priority than the first priority.

Aspect 4: The method of any of aspects 2 through 3, wherein the third priority is higher priority than the second priority.

Aspect 5: The method of any of aspects 2 through 4, wherein the first priority is higher priority than the second priority.

Aspect 6: The method of any of aspects 1 through 5, wherein the monitoring comprises: monitoring a first subset of the set of time resources for a plurality of the second set of SSB signals, wherein each of the plurality of the second set of SSB signals is associated with a different directional beam, wherein the second frequency range is associated with the first subset of the set of time resources; and monitoring a second subset of the set of time resources for the paging signal or the first set of SSB signals, wherein the first frequency range is associated with the second subset of the set of time resources.

Aspect 7: The method of aspect 6, wherein the first subset of the set of time resources is interleaved with the second subset of the set of time resources.

Aspect 8: The method of any of aspects 6 through 7, wherein the second subset of the set of time resources spans a duration that is equal to or less than a search period configured for the second set of SSB signals.

Aspect 9: The method of any of aspects 1 through 5, wherein the monitoring comprises: monitoring a first subset of the set of time resources for the first set of SSB signals, wherein the first frequency range is associated with the first subset of the set of time resources; and monitoring a second subset of the set of time resources for the paging signal, wherein the first frequency range is associated with the second subset of the set of time resources.

Aspect 10: The method of any of aspects 1 through 5, wherein the monitoring comprises: monitoring for one or both of the first set of SSB signals or the paging signal via the set of time resources; and refraining from monitoring the set of time resources for the second set of SSB signals based at least in part on the priority scheme.

Aspect 11: The method of any of aspects 1 through 10, wherein the first frequency range comprises FR1 and the second frequency range comprises FR2.

Aspect 12: The method of any of aspects 1 through 11, wherein the paging signal is associated with MSIM.

Aspect 13: The method of any of aspects 1 through 12, wherein the first frequency range and the second frequency range do not overlap.

Aspect 14: An apparatus for wireless communication at a UE, comprising a processor; memory coupled with the processor; and instructions stored in the memory and executable by the processor to cause the apparatus to perform a method of any of aspects 1 through 13.

Aspect 15: An apparatus for wireless communication at a UE, comprising at least one means for performing a method of any of aspects 1 through 13.

Aspect 16: A non-transitory computer-readable medium storing code for wireless communication at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    identifying a priority scheme for a plurality of signals, the plurality of signals including a first set of synchronization signal block signals associated with a first frequency range, a second set of synchronization signal block signals associated with a second frequency range, and a paging signal associated with the first frequency range; and
    monitoring, via a narrowband processor of the UE and based at least in part on the priority scheme, a set of time resources for at least one of the first set of synchronization signal block signals, the second set of synchronization signal block signals, or the paging signal, wherein the narrowband processor is configured to process signals received via the first frequency range and the second frequency range.

2. The method of claim 1, wherein identifying the priority scheme for the plurality of signals comprises:

identifying a first priority for the first set of synchronization signal block signals;
identifying a second priority for a second set of synchronization signal block signals; and
identifying a third priority for the paging signal.

3. The method of claim 2, wherein the third priority is higher priority than the first priority.

4. The method of claim 2, wherein the third priority is higher priority than the second priority.

5. The method of claim 2, wherein the first priority is higher priority than the second priority.

6. The method of claim 1, wherein the monitoring comprises:
monitoring a first subset of the set of time resources for a plurality of the second set of synchronization signal block signals, wherein each of the plurality of the second set of synchronization signal block signals is associated with a different directional beam, wherein the second frequency range is associated with the first subset of the set of time resources; and
monitoring a second subset of the set of time resources for the paging signal or the first set of synchronization signal block signals, wherein the first frequency range is associated with the second subset of the set of time resources.

7. The method of claim 6, wherein the first subset of the set of time resources is interleaved with the second subset of the set of time resources.

8. The method of claim 6, wherein the second subset of the set of time resources spans a duration that is equal to or less than a search period configured for the second set of synchronization signal block signals.

9. The method of claim 1, wherein the monitoring comprises:
monitoring a first subset of the set of time resources for the first set of synchronization signal block signals, wherein the first frequency range is associated with the first subset of the set of time resources; and
monitoring a second subset of the set of time resources for the paging signal, wherein the first frequency range is associated with the second subset of the set of time resources.

10. The method of claim 1, wherein the monitoring comprises:
monitoring for one or both of the first set of synchronization signal block signals or the paging signal via the set of time resources; and
refraining from monitoring the set of time resources for the second set of synchronization signal block signals based at least in part on the priority scheme.

11. The method of claim 1, wherein the first frequency range comprises FR1 and the second frequency range comprises FR2.

12. The method of claim 1, wherein the paging signal is associated with multi-subscriber identity modules.

13. The method of claim 1, wherein the first frequency range and the second frequency range do not overlap.

14. An apparatus for wireless communication at a user equipment (UE), comprising:
a processor;
memory coupled with the processor; and
instructions stored in the memory and executable by the processor to cause the apparatus to:
identify a priority scheme for a plurality of signals, the plurality of signals including a first set of synchronization signal block signals associated with a first frequency range, a second set of synchronization signal block signals associated with a second frequency range, and a paging signal associated with the first frequency range; and
monitor, via a narrowband processor of the UE and based at least in part on the priority scheme, a set of time resources for at least one of the first set of synchronization signal block signals, the second set of synchronization signal block signals, or the paging signal, wherein the narrowband processor is configured to process signals received via the first frequency range and the second frequency range.

15. The apparatus of claim 14, wherein the instructions to identify the priority scheme for the plurality of signals are executable by the processor to cause the apparatus to:
identify a first priority for the first set of synchronization signal block signals;
identify a second priority for a second set of synchronization signal block signals; and
identify a third priority for the paging signal.

16. The apparatus of claim 15, wherein the third priority is higher priority than the first priority.

17. The apparatus of claim 15, wherein the third priority is higher priority than the second priority.

18. The apparatus of claim 15, wherein the first priority is higher priority than the second priority.

19. The apparatus of claim 14, wherein the instructions to monitor are executable by the processor to cause the apparatus to:
monitor a first subset of the set of time resources for a plurality of the second set of synchronization signal block signals, wherein each of the plurality of the second set of synchronization signal block signals is associated with a different directional beam, wherein the second frequency range is associated with the first subset of the set of time resources; and
monitor a second subset of the set of time resources for the paging signal or the first set of synchronization signal block signals, wherein the first frequency range is associated with the second subset of the set of time resources.

20. The apparatus of claim 19, wherein the first subset of the set of time resources is interleaved with the second subset of the set of time resources.

21. The apparatus of claim 19, wherein the second subset of the set of time resources spans a duration that is equal to or less than a search period configured for the second set of synchronization signal block signals.

22. The apparatus of claim 14, wherein the instructions to monitor are executable by the processor to cause the apparatus to:
monitor a first subset of the set of time resources for the first set of synchronization signal block signals, wherein the first frequency range is associated with the first subset of the set of time resources; and
monitor a second subset of the set of time resources for the paging signal, wherein the first frequency range is associated with the second subset of the set of time resources.

23. The apparatus of claim 14, wherein the instructions to monitor are executable by the processor to cause the apparatus to:
monitor for one or both of the first set of synchronization signal block signals or the paging signal via the set of time resources; and
refrain from monitoring the set of time resources for the second set of synchronization signal block signals based at least in part on the priority scheme.

24. The apparatus of claim 14, wherein the first frequency range comprises FR1 and the second frequency range comprises FR2.

25. The apparatus of claim 14, wherein:
the paging signal is associated with multi-subscriber identity modules.

26. The apparatus of claim 14, wherein:
the first frequency range and the second frequency range do not overlap.

27. An apparatus for wireless communication at a user equipment (UE), comprising:
means for identifying a priority scheme for a plurality of signals, the plurality of signals including a first set of synchronization signal block signals associated with a first frequency range, a second set of synchronization signal block signals associated with a second frequency range, and a paging signal associated with the first frequency range; and
means for monitoring, via a narrowband processor of the UE and based at least in part on the priority scheme, a set of time resources for at least one of the first set of synchronization signal block signals, the second set of synchronization signal block signals, or the paging signal, wherein the narrowband processor is configured to process signals received via the first frequency range and the second frequency range.

28. The apparatus of claim 27, wherein the means for identifying the priority scheme for the plurality of signals comprise:
means for identifying a first priority for the first set of synchronization signal block signals;
means for identifying a second priority for a second set of synchronization signal block signals; and
means for identifying a third priority for the paging signal.

29. A non-transitory computer-readable medium storing code for wireless communication at a user equipment (UE), the code comprising instructions executable by a processor to:
identify a priority scheme for a plurality of signals, the plurality of signals including a first set of synchronization signal block signals associated with a first frequency range, a second set of synchronization signal block signals associated with a second frequency range, and a paging signal associated with the first frequency range; and
monitor, via a narrowband processor of the UE and based at least in part on the priority scheme, a set of time resources for at least one of the first set of synchronization signal block signals, the second set of synchronization signal block signals, or the paging signal, wherein the narrowband processor is configured to process signals received via the first frequency range and the second frequency range.

30. The non-transitory computer-readable medium of claim 29, wherein the instructions to identify the priority scheme for the plurality of signals are executable by the processor to:
identify a first priority for the first set of synchronization signal block signals;
identify a second priority for a second set of synchronization signal block signals; and
identify a third priority for the paging signal.

\* \* \* \* \*